United States Patent
Smith

(10) Patent No.: US 11,882,093 B2
(45) Date of Patent: Jan. 23, 2024

(54) MAC ADDRESS DESIGNATION

(71) Applicant: SR Technologies, Inc., Sunrise, FL (US)

(72) Inventor: Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 18/163,021

(22) Filed: Feb. 1, 2023

(65) Prior Publication Data
US 2023/0328030 A1    Oct. 12, 2023

Related U.S. Application Data

(60) Provisional application No. 63/323,693, filed on Mar. 25, 2022.

(51) Int. Cl.
*G06F 15/16* (2006.01)
*H04L 61/5038* (2022.01)

(52) U.S. Cl.
CPC .............................. *H04L 61/5038* (2022.05)

(58) Field of Classification Search
CPC ..... H04L 61/5038; H04L 61/58; H04L 61/10; H04L 61/2596
USPC .................................................. 709/245, 221
See application file for complete search history.

(56) References Cited

U.S. PATENT DOCUMENTS

| | | | |
|---|---|---|---|
| 11,588,785 B2* | 2/2023 | de la Oliva | H04L 61/5038 |
| 2004/0010624 A1* | 1/2004 | Garofalo | H04L 61/50 709/250 |
| 2007/0091882 A1* | 4/2007 | Moon | H04W 76/40 370/389 |
| 2013/0077611 A1* | 3/2013 | Shaikh | H04W 76/14 370/338 |
| 2013/0336317 A1* | 12/2013 | Mithyantha | H04L 45/18 370/390 |
| 2016/0269359 A1* | 9/2016 | Adrangi | H04W 12/02 |
| 2018/0084604 A1* | 3/2018 | Ou | H04W 76/36 |
| 2019/0150093 A1* | 5/2019 | Kweon | H04W 76/30 370/311 |
| 2021/0014679 A1* | 1/2021 | Liu | H04W 12/50 |
| 2022/0086627 A1* | 3/2022 | Montemurro | H04L 61/5076 |
| 2022/0377554 A1* | 11/2022 | Henry | H04W 12/122 |

* cited by examiner

*Primary Examiner* — Kaylee J Huang
(74) *Attorney, Agent, or Firm* — Christopher & Weisberg, P.A.

(57) ABSTRACT

A method, apparatus, and system are described. A method in an access point (AP) configured for medium access control (MAC) address designation (MAAD) is described. The AP is configured to wirelessly communicate with a station (STA). The method comprises determining a first MAC address of the STA, where the first MAC address is usable as a transmitter address (TA) of the STA for a subsequent association to the AP by the STA, and transmitting the first MAC address to the STA in one of a response action frame and a message of a multiple-message handshake process.

20 Claims, 13 Drawing Sheets

Action field format

| Bit | Information | Notes |
|---|---|---|
| <ANA> | MAAD Capability | The MAAD Capability subfield may be set to 1 to indicate support for MAAD and set to 0 if MAAD is not supported. |

MAAD Capability addition to
Extended Capabilities field

MAAD Action field

| Action Details field value | Meaning |
|---|---|
| 0 | MAAD Request |
| 1 | MAAD Response |
| 2-255 | Reserved |

MAAD Request Action field

550

| Category | MAAD Action (0) |
|---|---|

301    302

MAAD Response Action field

570

| Category | MAAD Action (1) | MAAD MAC #1 | MAAD MAC #2 |
|---|---|---|---|

301    302    580    590

MAC ADDRESS DESIGNATION

CROSS-REFERENCE TO RELATED APPLICATION

This application is related to and claims priority to U.S. Provisional Patent Application Ser. No. 63/323,693, filed Mar. 25, 2022, entitled MAC ADDRESS DESIGNATION, the entirety of which is incorporated herein by reference.

TECHNICAL FIELD

The present disclosure relates to a method for addressing in wireless local area networks (WLANs).

BACKGROUND

Initially, it is noted that IEEE Standard 802.11-2020 is used as the base reference for disclosures used herein, the entire contents of which are incorporated herein by reference. The IEEE 802.11-2020 Standard is commonly referred to as "Wi-Fi" and may be referred to as "Wi-Fi" or the "Standard" herein. This disclosure relates to the addressing used by devices that are based upon the IEEE 802.11 technology.

The medium access control, MAC, address of a Wi-Fi device is a unique hardware address that identifies the device. However, having this MAC address openly broadcast has meant that the device may be easily observed and tracked, without the user's permission.

FIG. 1 is a block schematic diagram of an example IEEE 802.11 infrastructure network 100. A number of mobile nodes, or stations (STA) 120a, 120b, 120c, 120d, 120e and 120f (collectively referred to as "STAs 120" and singularly referred to as "STA 120") may or may not be associated with access point (AP) 110 which, in turn, is in communication with a hard-wired distribution system (DS) 130. In such a network, the AP 110 will periodically transmit beacons in order to allow the unassociated STAs 120 to locate and identify the network and will allow the AP 110 to convey information to the associated STAs 120.

FIG. 2 depicts the IEEE 802.11 Management frame format 200. The frame format 200 includes of a MAC Header 210, which comprises Frame Control field 212, Duration 213 field, Address fields, 215, 216 and 217, optional Sequence Control 218 field, optional HT Control field 219, a variable length Frame Body field 220 and a Frame Check Sum (FCS) field 230. Type and Subtype fields in the Frame Control field 212 define the function of the frame, for example, Association Request is Type 00, Subtype 0000, and Management Action frame is Type 00, Subtype 1101. In the MAC Header 210, Address field 1 215 identifies the receiver address RA of the intended receiver of the frame, and Address field 2 216 identifies the transmitter address (TA) of the transmitter of the frame. Each address field contains a 48-bit address known as a MAC address. An Individual/Group (UG) bit is always transmitted first, and a Universal/Local (U/L) bit is transmitted second. A MAC address where the U/L bit is set to 1 is referred to as being a "locally administered" MAC address.

In order to associate to the AP 110, STA 120 sends an Association Request management frame to the AP 110 with Address field 1 215, the RA, set to the MAC address of the AP 110, and with Address field 2 216, the TA, set to the STA's MAC address. Similarly, if STA 120 is searching for AP 110, STA 120 may transmit Probe Request management frames and set Address field 2 216, TA, to the MAC address of the STA 120.

As described in the Standard (Clause 4.5.4.10), when a Wi-Fi station, STA 120, is searching for, or connects to a Wi-Fi network, i.e., an access point AP 110, the addressing of its MAC layer for the particular connection is defined. Similarly, when a STA attempts to discover services on a network, before associating, i.e., preassociation, the addressing of its MAC layer is also defined. If STA 120 uses a fixed MAC address it is trivial to track the STA 120, and this tracking may be used to glean private and sensitive information regarding the individual behind the STA 120. Furthermore, even without establishing a connection, a mobile or portable STA 120 that gratuitously transmits Probe Request frames containing service set identifiers (SSIDs) of favored networks can reveal potentially sensitive information about the STA's location and location history. To mitigate this privacy concern, a STA may periodically change its MAC address prior to association.

"Requirements for support of MAC privacy enhancements" was introduced in the IEEE 802.11-2020 Standard. The Standard states that a STA may periodically change its MAC address to a random value while not associated. The STA shall, however, set the locally administered address bit in the MAC address. Although not specifically described in the Standard, in the general sense if the STA is (re)associating with an AP with which it has been previously associated, the STA changes its MAC address to that used when previously associated.

The introduction of MAC randomization has generally prevented the tracking of users, but it also has caused some impact and problems with some network operations and "use cases" that require some knowledge of an identity of a STA. In other words, the use of randomization of the MAC address can create issues. Such issues may include the use cases of steering of STAs to appropriate APs/networks, parental controls, network access controls, device limits, and diagnostics. The requirement that a STA 120 uses the same MAC address every time it (re)associates to the same AP 110 does mitigate some of the issues, to some extent, but this requirement does introduce a degree of privacy concern.

SUMMARY

According to one aspect of the present disclosure, a method in an access point (AP) configured for medium access control (MAC) address designation (MAAD) is described. The AP is configured to wirelessly communicate with a station (STA). The method comprises determining a first MAC address of the STA, where the first MAC address is usable as a transmitter address (TA) of the STA for a subsequent association to the AP by the STA, and transmitting the first MAC address to the STA in one of a response action frame and a message of a multiple-message handshake process.

In some embodiments, the method further includes determining a second MAC address of the STA, where the second MAC address is usable for probes.

In some other embodiments, the first MAC address is transmitted during a first association to the AP by the STA, where the subsequent association occurs after the first association.

In some embodiments, the method further includes performing the subsequent association using the first MAC address.

In some other embodiments, the method further includes receiving a request action frame from the STA, where the received request action frame triggers one or both of the determination of the first MAC address and the transmission of the first MAC address in the response action frame.

In some embodiments, the method further includes receiving a random MAC as the TA, where the received random MAC triggers one or both of the determination of the first MAC address and the transmission of the first MAC address.

In some other embodiments, the method includes receiving an association request from the STA, where the association request comprises one MAC address selected by the STA as the TA from a first list of MAC addresses stored at the STA, and identifying the STA from a second list of MAC addresses stored at the AP based on received association request.

In some embodiments, the identification of the STA triggers one or both of the determination of the first MAC address and the transmission of the first MAC address.

In some other embodiments, the first MAC address is transmitted to the STA in the message of the multiple-message handshake process using a key encapsulation (KDE) format.

In some embodiments, the method further includes inserting a code into the first MAC address, where the code is usable for identification of the STA.

In some other embodiments, one or more of the method further includes receiving a first capability message from the STA 120 indicating the STA 120 supports MAAD; the transmission of the first MAC address is one or both of unsolicited by the STA and in response to the first capability message; the method further includes transmitting a second capability message to the STA indicating the AP supports MAAD; and the first MAC address is a MAAD MAC address.

According to another aspect, an access point (AP) configured for medium access control (MAC) address designation (MAAD) is described. The AP is configured to wirelessly communicate with a station (STA). The AP comprises processing circuitry configured to determine a first MAC address of the STA, where the first MAC address is usable as a transmitter address (TA) of the STA for a subsequent association to the AP by the STA, and cause transmission of the first MAC address to the STA in one of a response action frame and a message of a multiple-message handshake process.

In some embodiments, the processing circuitry is further configured to determine a second MAC address of the STA, the second MAC address being usable for probes.

In some other embodiments, the first MAC address is transmitted during a first association to the AP by the STA, where the subsequent association occurs after the first association.

In some embodiments, the processing circuitry is further configured to perform the subsequent association using the first MAC address.

In some other embodiments, the processing circuitry is further configured to receive a request action frame from the STA, where the received request action frame triggers one or both of the determination of the first MAC address and the transmission of the first MAC address in the response action frame.

In some embodiments, the processing circuitry is further configured to receive a random MAC as the TA, where the received random MAC triggers one or both of the determination of the first MAC address and the transmission of the first MAC address.

In some other embodiments, the processing circuitry is further configured to receive an association request from the STA, where the association request comprises one MAC address selected by the STA as the TA from a first list of MAC addresses stored at the STA, and identify the STA from a second list of MAC addresses stored at the AP based on received association request.

According to one aspect, a system configured for medium access control (MAC) address designation (MAAD) is described. The system comprises an access point (AP) and a station (STA). The AP is configured to wirelessly communicate with the STA. The AP comprises first processing circuitry configured to determine a first MAC address of the STA, where the first MAC address is usable as a transmitter address (TA) of the STA for a subsequent association to the AP by the STA, and the subsequent association is to occur after a first association; cause transmission, during the first association to the AP by the STA, of the first MAC address to the STA in one of a response action frame and a message of a multiple-message handshake process; and perform the subsequent association using the first MAC address transmitted to the STA. The STA comprises second processing circuitry configured to receive, during the first association to the AP by the STA, the first MAC address from the AP in one of the response action frame and the message of the multiple-message handshake process and cause transmission of a subsequent association request to the AP using the first MAC address received from the AP.

In some embodiments, the second processing circuitry is further configured to cause transmission of a first association request to associate to the AP using one of a random MAC address and one MAC address selected by the STA as the TA from a first list of MAC addresses stored at the STA.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 5 depicts examples of the MAAD action fields that may be used when the MAAD MAC address is allocated using an exchange of action frames;

DETAILED DESCRIPTION

A method, "MAC Address Designation (MAAD)", apparatus, and system are disclosed for a STA 120 to use a MAC Address as the TA that the AP 110 has previously allocated to that STA 120, therefore enabling the STA 120 to be identified by the AP 110. The MAC address used by the STA 120 is a random address, known only to the AP 110, and hence third parties are prevented from tracking the STA 120. Only a trusted AP 110 can recognize or identify that STA 120.

Figure 1:
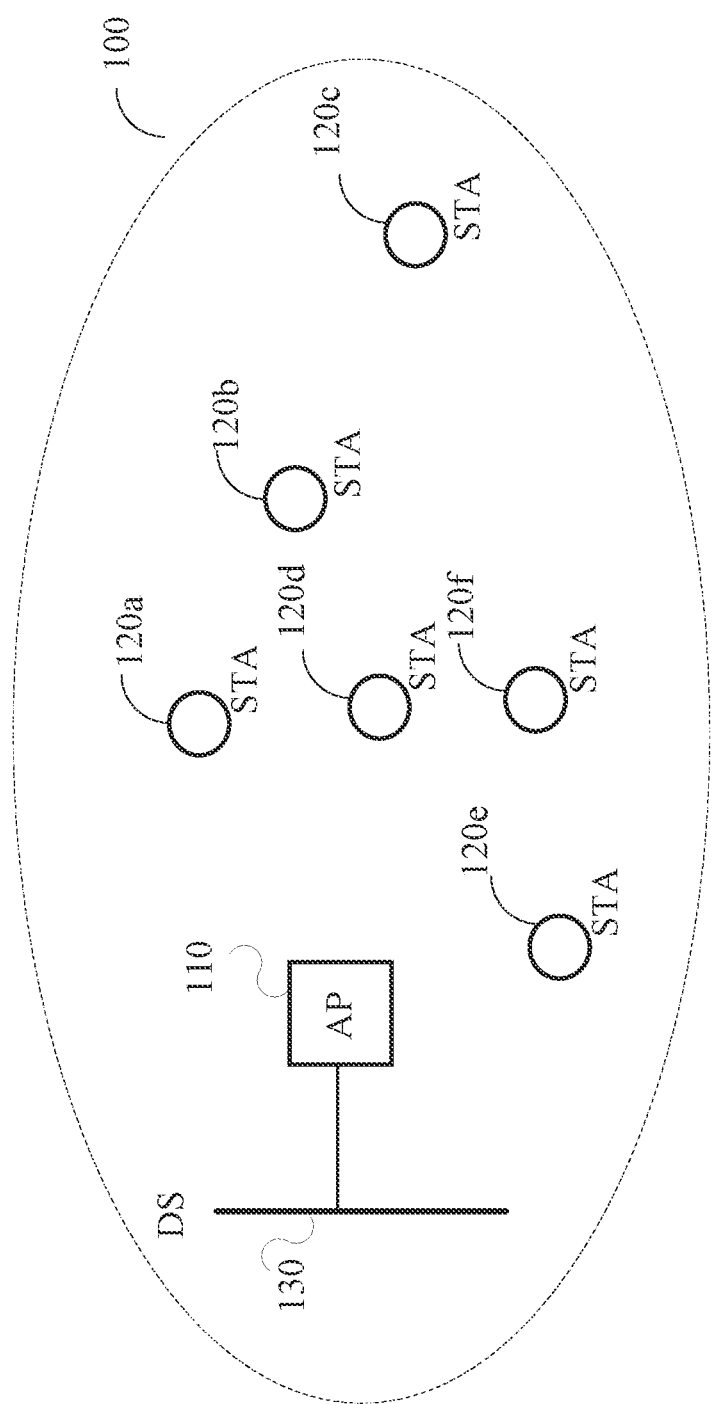
FIG. 1 is a block schematic diagram of a typical IEEE 802.11 infrastructure network.
Figure 2:
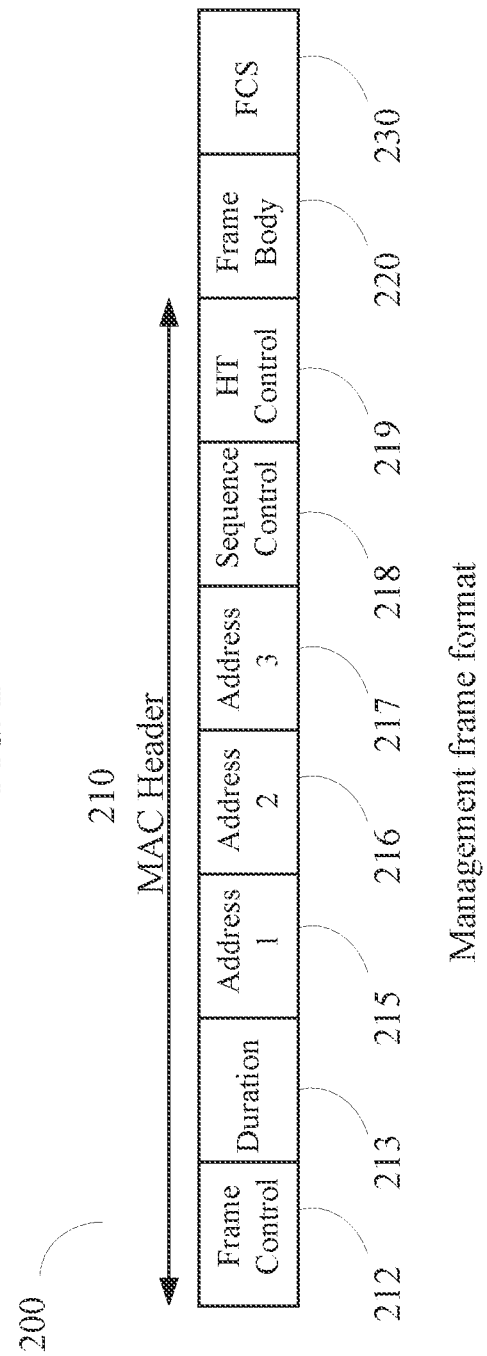
FIG. 2 depicts the IEEE 802.11 Management frame format.
Figures 3, 4:
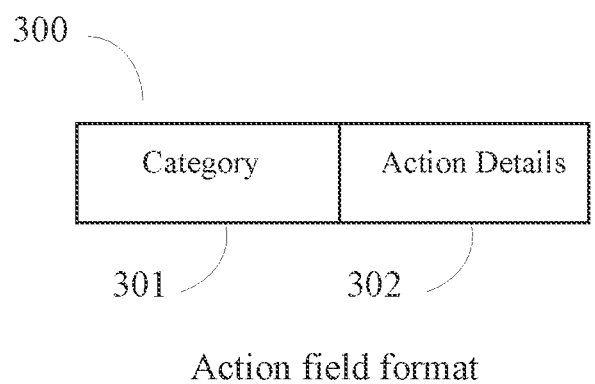
FIG. 3 depicts the format of a management Action field.
FIG. 4 depicts a Capability bit, MAC Address Designation (MAAD) Capability, that may be added to the Extended Capabilities Information element.

Referring again to the drawing figures in which like reference designators refer to like elements, an Association Request management frame has the general format shown in FIG. 2. FIG. 3 depicts the format of an example management Action field 300 which comprises a Category field 301 and Action Details field 302. Once associated, an AP 110 and a STA 120 can use management Action frames to communicate with each other.

A more complete understanding of the details of the present invention, will be more readily understood by first providing an outline of the MAAD method.

The MAAD method is that an AP 110 allocates a MAAD MAC address, address #1, to a STA 120 that the STA 120 will use as its TA the next time that STA 120 associates with the AP 110. An AP 110 may optionally also allocate a second MAAD MAC address, address #2, to a STA 120. For example, STA 120 may use the allocated MAAD MAC address #2 as the TA in directed and broadcast probes and may use the allocated MAAD MAC address #1 in the Association Request. STA 120 is allocated new MAAD MAC address(es) every time it associates to AP 110, therefore ensuring that the STA 120 uses a different TA for each association and hence that STA 120 is unidentifiable to a third party. Two methods of allocating the new MAAD MAC address(es) are disclosed: exchange of robust action frames and including key data into message 3 of the 4-way handshake used to provide and exchange keys during association.

FIG. 4 depicts a MAAD Capability bit, in this case a bit indicating MAAD Capability, that may be added to the Extended Capabilities Information element. An AP 110 may include this MAAD Capability bit 400 in the Extended Capabilities Information element in its beacons to indicate that the AP 110 supports MAAD. A STA 120 may include this MAAD Capability bit 400 in the Extended Capabilities Information element in its probes and association request. The position of the bit in the Extended Capabilities Information element is assigned by the 802.11 Working Group Assigned Numbers Authority (ANA). Setting the bit to 0, or omitting the bit, indicates that MAAD is not supported.

FIG. 5 depicts examples of the MAAD action fields that may be used when MAAD MAC addresses are allocated using exchange of action frames. Table 500 contains a set of the Action Details field 302 values for a set of MAAD Action frames with Action field format 300 that may be exchanged between AP 110 and STA 120 once STA 120 is associated. An Action Details field 302 value of 0 means that the action frame is a MAAD Request Action frame 550 and an Action Details field 302 value of 1 indicates that the action frame is a MAAD Response Action frame 570. This list should not be construed as exhaustive and should be considered as a list of example action frames. Other Action Detail field values may be used. The MAAD Request Action field 550 includes the Category field 301 and the Action Details field 302. The Action Details field 302 may be set to 0, as shown in Table 500, indicating that the action frame is the MAAD Request Action field 550. The MAAD Response Action frame 570 includes Category field 301, Action Details field 302, MAAD MAC #1 field 580, and optionally MAAD MAC #2 field 590. The Action details field 302 may be set to 1, as shown in Table 500, indicating that the action frame is the MAAD Response Action frame 570. In order to comply with IEEE 802.11-2020 9 (i.e., the Standard), the MAAD MAC #1 580, and MAAD MAC #2 590 may be 48-bit addresses that are constructed from the locally administered address space. MAAD MAC address #2 590 may be optional, but for clarity, in the following descriptions it will be assumed that it is present.

A more complete understanding of the present invention, and the attendant advantages and features thereof, will be more readily understood by reference to the following outline of the MAAD method for the case when the MAAD MAC addresses are allocated using an exchange of robust action frames. An AP 110 may indicate that it supports MAAD by setting a MAAD Capability bit in the Extended Capabilities Information element that is transmitted in its beacons. A STA 120 may not indicate that it supports MAAD. When a STA 120 first associates to an AP 110, if the STA 120 intends to be identifiable, then the STA 120 may send a MAAD Request Action frame, and the AP 110 responds with a MAAD Response Action frame that comprises the MAAD MAC address(es). STA 120 may store the allocated MAAD MAC address(es) as a reference for that AP 110. The STA 120 then may use that allocated MAAD MAC #1 address 580 as its TA when it again associates to that same AP 110. In so doing, the AP 110 will identify the STA 120. Each time, when associated, if the STA 120 intends to be identifiable, the STA 120 associates to AP 110 using the last allocated MAAD MAC address #1 580 from that AP 110, as the TA. While associated, STA 120 may send a MAAD Request Action frame to AP 110 which responds with a MAAD Response Action frame that contains (new) MAAD MAC addresses. The STA 120 may send the MAAD Request Action frame at any time whilst associated. This exchange of action frames is not part of the association process as the STA 120 has already been identified from the TA, the allocated MAAD MAC address #1 580. Allocating new MAAD MAC address(es), 580 and optionally 590, during each association ensures that the STA 120 uses a different TA for each association, and hence that STA 120 is unidentifiable to a third party. When sending directed or broadcast probes, STA 120, when in the vicinity of AP 110, if it wants to be identified, may use MAAD MAC address

2, 590, if allocated, as the TA and, by so doing, further protects the association address, MAAD MAC address #1 580 from copying.

Another method for the AP 110 to allocate MAAD MAC addresses to STA 120 is to include it in a key data encapsulation KDE in a message (e.g., message 3) of a multiple-message handshake (e.g., a 4-way handshake).

Figure 6:
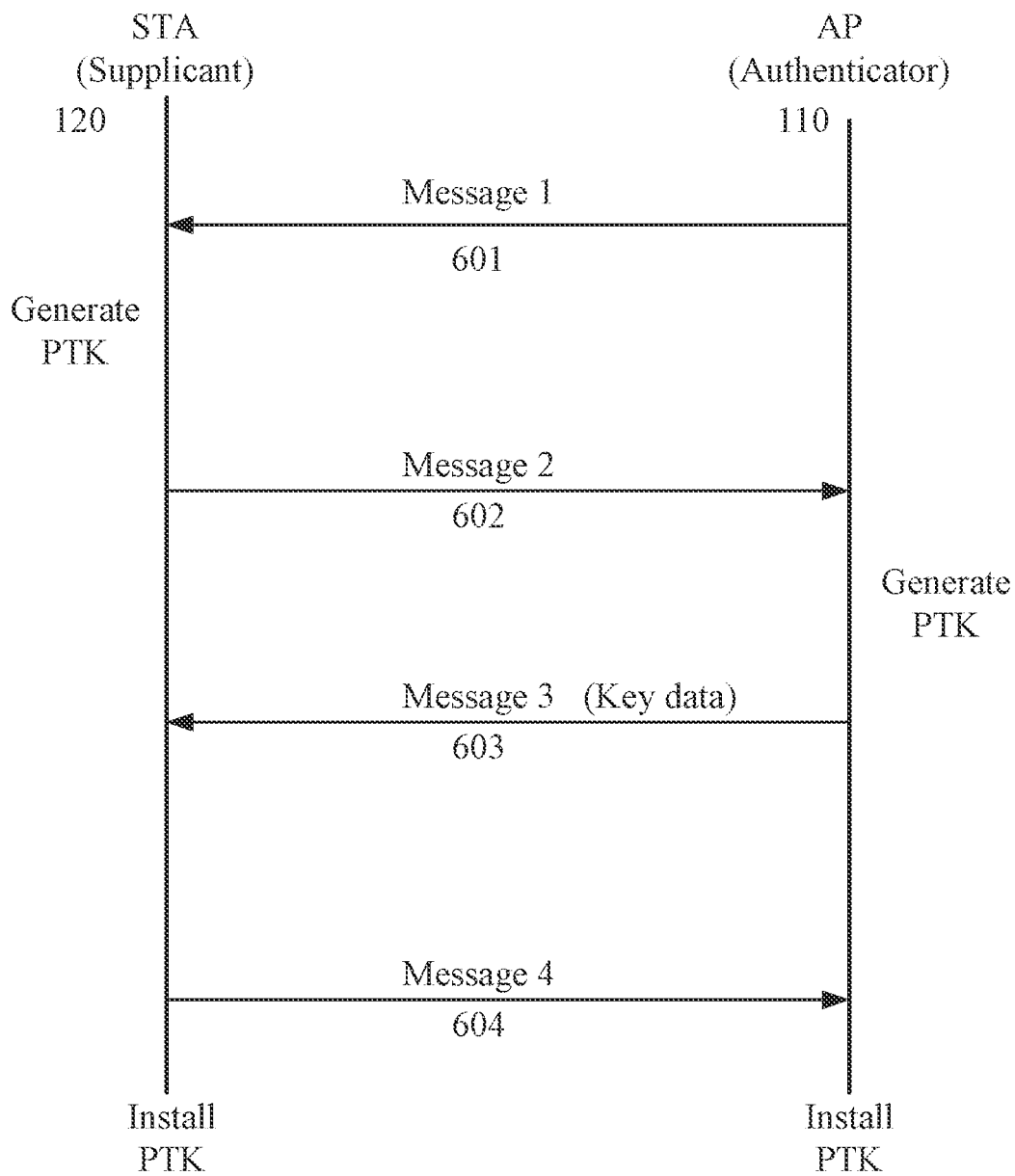
FIG. 6 is a diagram of example messages exchanged during the 4-way handshake that occurs when a STA associates with an AP using robust secure network association RSNA.

FIG. 6 is a diagram of examples of the messages exchanged during the 4-way handshake that occurs when a STA 120 associates with an AP 110 using robust secure network association (RSNA). The 4-way handshake is specified in detail in the Standard, hence, only an outline of the procedure is described herein. Both the STA 120 and the AP 110 share a pairwise master key (PMK), i.e., the network "password". The handshake starts when AP 110 sends message 1 601 to the STA 120 which STA 120 uses to generate a pairwise transient key (PTK). STA 120 then sends message 2 602 to AP 110 with information such that AP 110 can also generate the PTK. AP 110 then sends message 3 603 that comprises the group temporal key (GTK) to STA 120. Further, message 4 604 is sent by STA 120 to AP 110 to confirm that the keys PTK and GTK have been installed. In message 3 603, the AP may include a "Key Data" field which is a variable length field used to include additional data. This field may be used by AP 110 to send new MAAD MAC addresses to STA 120.

Figure 7:
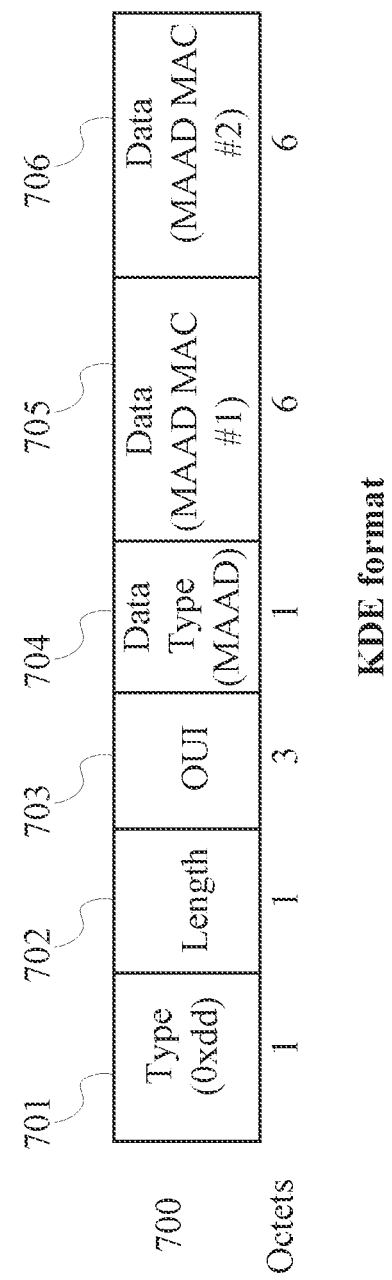
FIG. 7 depicts an example of a key data encapsulation (KDE) format, MAAD KDE.

FIG. 7 depicts an example of a key data encapsulation (KDE) format 700, i.e., MAAD KDE. The Type field 701 is set to 0xdd as specified in the Standard for KDEs. The Length field 702 specifies the number of octets in the following fields 703, 704, 705 and optionally 706. As specified in "Table 12-9—KDE selectors" in the Standard, the OUI field is set to 00-OF-AC. The data type field 704 is used to define the meaning of the KDE. A new data type may be assigned with associated meaning "MAAD", i.e., a new data type may be added to Table 12-9—KDE selectors in the Standard. In the case that the KDE is used for the allocation of the MAAD MAC addresses, then the data type field 704 is set to a value that indicates this is a MAAD KDE, and the data fields 705 and optionally 706 comprise the new allocated MAAD MAC address(es), #1 (and #2, respectively). MAAD MAC #2 address 706 may be optional, but for simplicity, in the following descriptions, it will be assumed that it is present.

A more complete understanding of the present invention, and the attendant advantages and features thereof, will be more readily understood by reference to the following outline of the MAAD method for the case when the MAAD MAC addresses are allocated using a MAAD KDE inserted into message 3 603 of the 4-way handshake.

An AP 110 may indicate that it supports MAAD by setting a MAAD Capability bit in the Extended Capabilities Information element that is transmitted in its beacons. A STA 120 may also indicate that it supports MAAD by setting a MAAD Capability bit in the Extended Capabilities Information element that is transmitted in probes association and reassociation requests. When a STA 120 first associates to an AP 110, and STA 120 is indicating support for MAAD, then AP 110 will include a MAAD KDE 700 in message 3 603 of the 4-way handshake which allocates new MAAD MAC addresses, #1 705 and #2 706. The STA 120 then may use allocated MAAD MAC #1 705 address as its TA when it again associates to that same AP 110. In so doing, the AP 110 may identify the STA 120 and allocate new MAAD MAC addresses #1 705 and #2 706 using the MAAD KDE. Each time, when associating, the STA 120 may use the last allocated MAAD MAC #1 705 address from that AP 110, as the TA. Allocating a new MAAD MAC #1 705 address during each association ensures that the STA 120 uses a different TA for each association and hence that STA 120 is unidentifiable to a third party. When sending directed or broadcast probes, STA 120, when in the vicinity of AP 110, if it wants to be identified, may use MAAD MAC #2 address, 706, as the TA, and, by so doing, further protects the association address, MAAD MAC address #1 705 from copying.

Figure 8:
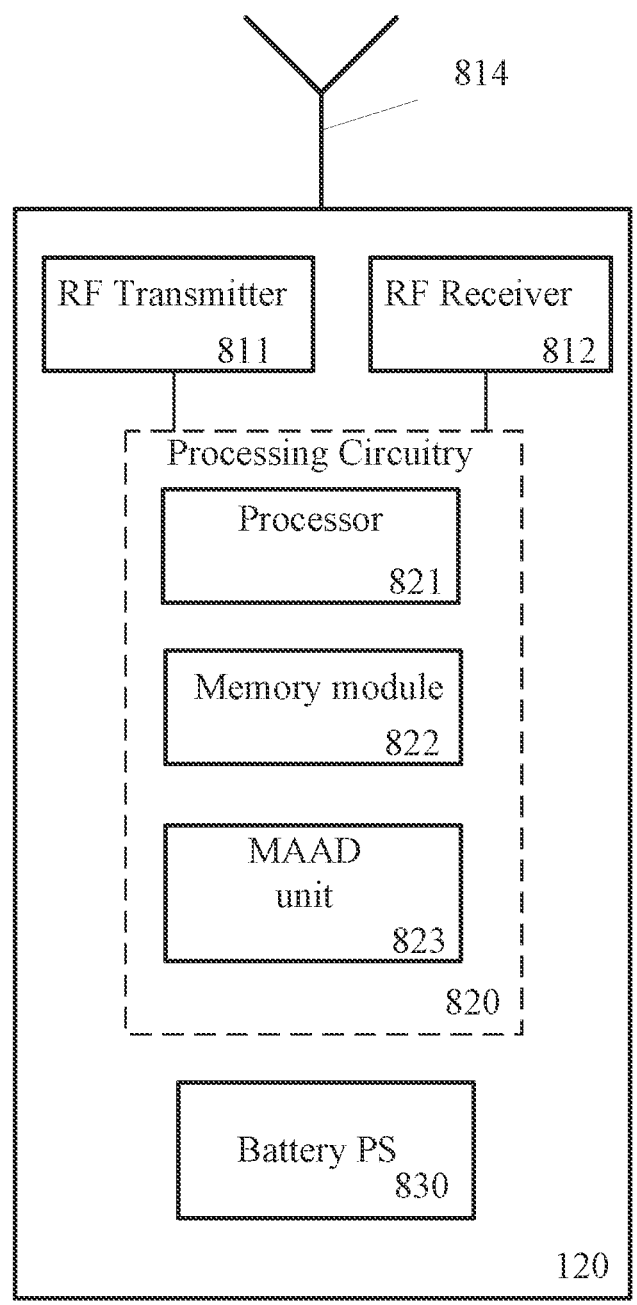
FIG. 8 illustrates an example of a mobile station STA, according to embodiments of the present disclosure.

FIG. 8 illustrates an example of a mobile station STA 120, according to embodiments of the present disclosure. Mobile station STA 120 may be a wireless device that is based upon the Standard. In one embodiment, mobile station STA 120 may include an antenna assembly 814, a radio frequency (RF) receiver 812, an RF transmitter 811, processing circuitry 820 and a battery powered power supply 830. The antenna assembly 814 may comprise several antennas such that STA 120 may transmit and receive signals in the various frequency bands covered by the 802.11 specification and enable features such as multiple input multiple output (MIMO) and beamforming. The RF receiver 812 may receive radio frequency (RF) signals from the antenna assembly 814. The RF receiver 812 may comprise one or more receiver paths. The RF receiver 812 may perform the usual functions of an RF receiver such as low noise amplification, filtering, and frequency down conversion so as to condition the received signal suitable for inputting to the processing circuitry 820. The processing circuitry 820 may perform the usual baseband functions such as demodulation, descrambling, and error correction of received packets as described in the Standard. The RF transmitter 811 may comprise one or more transmitter paths. The RF transmitter 811 may perform the usual functions of an RF transmitter such as up conversion, filtering and power amplification of the baseband signal received from the processing circuitry 820. The processing circuitry 820 may perform the usual baseband functions such as coding, scrambling and modulation of packets to be transmitted as described in the Standard.

The processing circuitry 820 may include a processor 821, a memory 822, and the MAAD unit 823. In addition to a traditional processor and memory, processing circuitry 820 may comprise integrated circuitry for processing and/or control, e.g., one or more processors and/or processor cores and/or FPGAs (Field Programmable Gate Array) and/or ASICs (Application Specific Integrated Circuitry). Processor 821 may be configured to access (e.g., write to and/or reading from) memory 822, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 822 may be configured to store code executable by processor 821 and/or other data, e.g., data pertaining to communication, e.g., configuration and/or address data of nodes, etc.

Processing circuitry 820 may be configured to control any of the methods and/or processes described herein and/or to cause such methods and/or processes to be performed, e.g., by mobile station STA 120. Corresponding instructions may be stored in the memory 822, and/or in the MAAD unit 823 which may be readable and/or readably connected to processor 821. In other words, processing circuitry 820 may comprise a microprocessor and/or microcontroller and/or FPGA (Field-Programmable Gate Array) device and/or ASIC (Application Specific Integrated Circuit) device. The MAAD unit 823 may be configured to perform the MAAD processes such as action frame formatting, KDE interpretation, and/or reading and writing to the memory 822 for the storage of the allocated MAAD MAC addresses and their corresponding APs.

Figure 9:
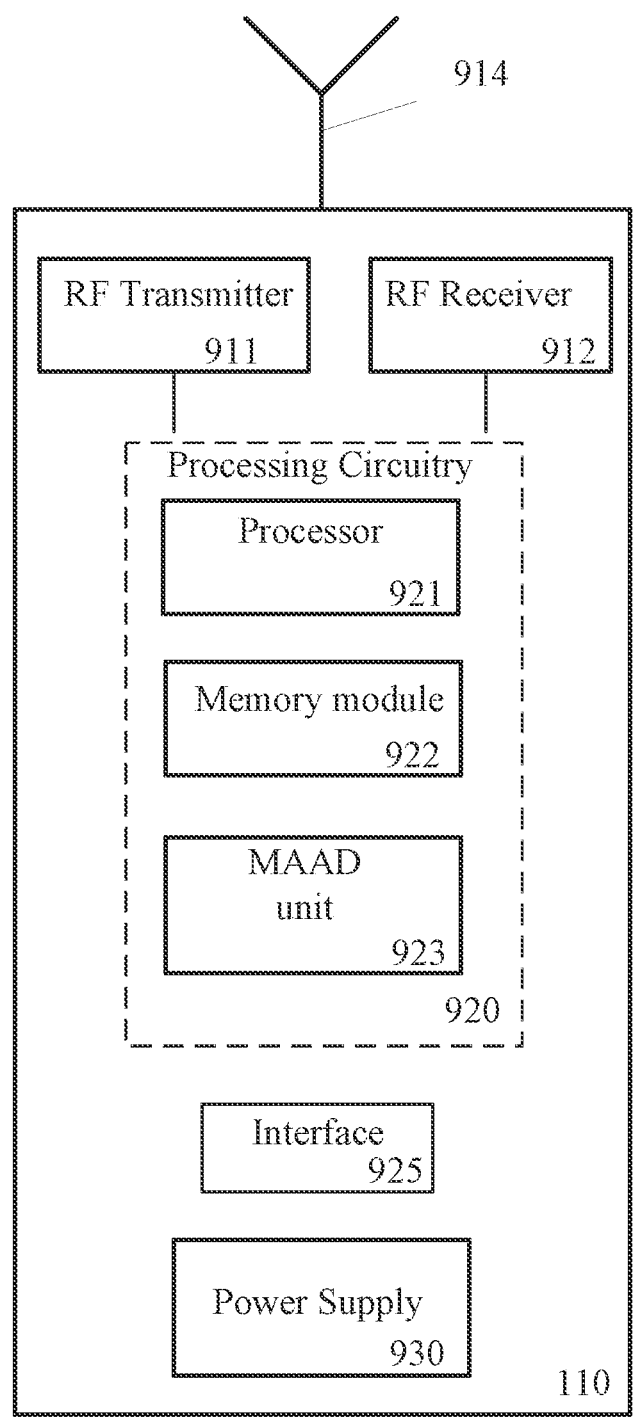
FIG. 9 illustrates an example of an access point AP, according to embodiments of the present disclosure.

FIG. 9 illustrates an example of an access point AP 110, according to embodiments of the present disclosure. AP 110 may be a wireless device that is based upon the IEEE 802.11 specification. In one embodiment, AP 110 may include an antenna assembly 914, a radio frequency (RF) receiver 912, an RF transmitter 911, processing circuitry 920, an interface 925 and a power supply 930. Interface 925 may connect the processing circuitry 920 via Ethernet to the DS 130. Antenna assembly 914 may comprise several antennas such that AP 110 may transmit and receive signals in the various frequency bands covered by the 802.11 specification and enable features such as multiple input multiple output (MIMO) and beamforming. The RF receiver 912 may receive radio frequency (RF) signals from the antenna assembly 914. The RF receiver 912 may comprise one or more receiver paths. The RF receiver 912 may perform the usual functions of an RF receiver such as low noise amplification, filtering, and frequency down conversion so as to condition the received signal suitable for inputting to the processing circuitry 920. The processing circuitry 920 may perform the usual baseband functions such as demodulation, descrambling, and error correction of received packets as described in the Standard. The RF transmitter 911 may comprise one or more transmitter paths. The RF transmitter 911 may perform the usual function of an RF transmitter such as up conversion, filtering and power amplification of the baseband signal received from the processing circuitry 920. The processing circuitry 920 may perform the usual baseband functions such as coding, scrambling and modulation of packets to be transmitted as described in the Standard.

The processing circuitry 920 may include a processor 921, a memory 922, and the MAAD unit 923. In addition to a traditional processor and memory, processing circuitry 920 may comprise integrated circuitry for processing and/or control, e.g., one or more processors and/or processor cores and/or FPGAs (Field Programmable Gate Array) and/or ASICs (Application Specific Integrated Circuitry). Processor 921 may be configured to access (e.g., write to and/or reading from) memory 922, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 922 may be configured to store code executable by processor 921 and/or other data, e.g., data pertaining to communication, e.g., configuration and/or address data of nodes, etc.

Processing circuitry 920 may be configured to control any of the methods and/or processes described herein and/or to cause such methods and/or processes to be performed, e.g., by AP 110. Corresponding instructions may be stored in the memory 922 and/or the MAAD unit 923 which may be readable and/or readably connected to processor 921. In other words, processing circuitry 920 may comprise a microprocessor and/or microcontroller and/or FPGA (Field-Programmable Gate Array) device and/or ASIC (Application Specific Integrated Circuit) device. The MAAD unit 923 may be configured to perform the MAAD processes such as action frame formatting, KDE formatting, and reading and writing to the memory 922 for the storage of the allocated MAAD MAC addresses and their corresponding STAs.

Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not limited to mean a physical connection nor a direct connection (i.e., connections other than physical and other than direct are also possible). It is contemplated that the signal path between one element and another may traverse multiple physical devices.

Thus, in some embodiments, the processing circuitries 820 and 920 may include the memory 822 and 922 respectively, and a processor 821 and 921 respectively, the memories 822 and 922 containing instructions which, when executed by the processors 821 and 921 respectively, configure the processor 821 or 921 to perform the one or more functions described herein. In addition to a traditional processor and memory, the processing circuitries 820 and 920 may comprise integrated circuitry for processing and/or control, e.g., one or more processors and/or processor cores and/or FPGAs (Field Programmable Gate Array) and/or ASICs (Application Specific Integrated Circuitry).

The processors 821 and 921 may include and/or be connected to and/or be configured for accessing (e.g., writing to and/or reading from) the memories 822 and 922 respectively, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 822 and 922 may be configured to store code executable by control circuitry and/or other data, e.g., data pertaining to communication, configuration and/or address data of nodes, etc. The processing circuitry 820 and 920 may be configured to control any of the methods described herein and/or to cause such methods to be performed, e.g., by the processors 821 and 921. Corresponding instructions may be stored in the memory 822 or 922, which may be readable and/or readably connected to the processing circuitry 820 or 920. In other words, the processing circuitries 820 and 920 may include a controller, which may comprise a microprocessor and/or microcontroller and/or FPGA (Field-Programmable Gate Array) device and/or ASIC (Application Specific Integrated Circuit) device. It may be considered that the processing circuitries 820 and 920 include or may be connected or connectable to memory, which may be configured to be accessible for reading and/or writing by the controller and/or processing circuitry 820 or 920.

According to an embodiment of the disclosure, STA 120 is arranged to receive transmissions of another wireless device such as AP 110, and processing circuitry 820 is arranged to monitor attributes of those transmissions. For example, processing circuitry 820 may be arranged to monitor attributes of those beacon transmissions of AP 110, and determine that AP 110 supports MAAD by examination of the Extended Capabilities field in the Beacon and determining that the MAAD capability bit is set therein. STA 120 is arranged to transmit to AP 110 an Association Request frame where the TA is MAAD MAC #1 address 705 that was allocated to the STA 120 by the AP 110 from the last, or a previous, association. According to another embodiment of the disclosure, AP 110 is arranged to monitor the Association Request frame from STA 120. The processing circuitry 920 in AP 110 may be arranged to check through stored MAAD MAC #1 and #2 allocations to find the MAAD MAC that corresponds to the TA of the Association Request sent by STA 120. Memory 922 in AP 110 may be arranged to store MAAD MAC addresses, together with an identifier for each STA that has associated and sent a MAAD Request Action frame 550. Similarly, memory 822 in STA 120 may be arranged to store the MAAD MAC addresses that it has been allocated by each AP 110 with which it has previously associated with and has received a MAAD Response Action frame 570 containing a MAAD MAC addresses 705 and 706.

According to an embodiment of the disclosure, STA 120 and AP 110 are arranged to be capable of carrying out the function of association, as described in the Standard, and to communicate with each other, securely, once associated. In one embodiment of this disclosure, once associated, STA 120 and AP 110 are arranged to exchange Action frames 300 and their respective processing circuitries 820 and 920 are particularly arranged to exchange and interpret the MAAD Action frames, 550 and 570 the details of which are discussed above with reference to FIG. 5. In another embodiment of this disclosure, processer circuitry 920 in AP 110 is arranged to include a MAAD KDE 700 in message 3 603 of the 4-way handshake between the AP 110 and STA 120 during association and processor circuitry 820 in STA 120 is arranged to receive and decrypt the MAAD MAC addresses included in that MAAD KDE 700.

Figure 10:
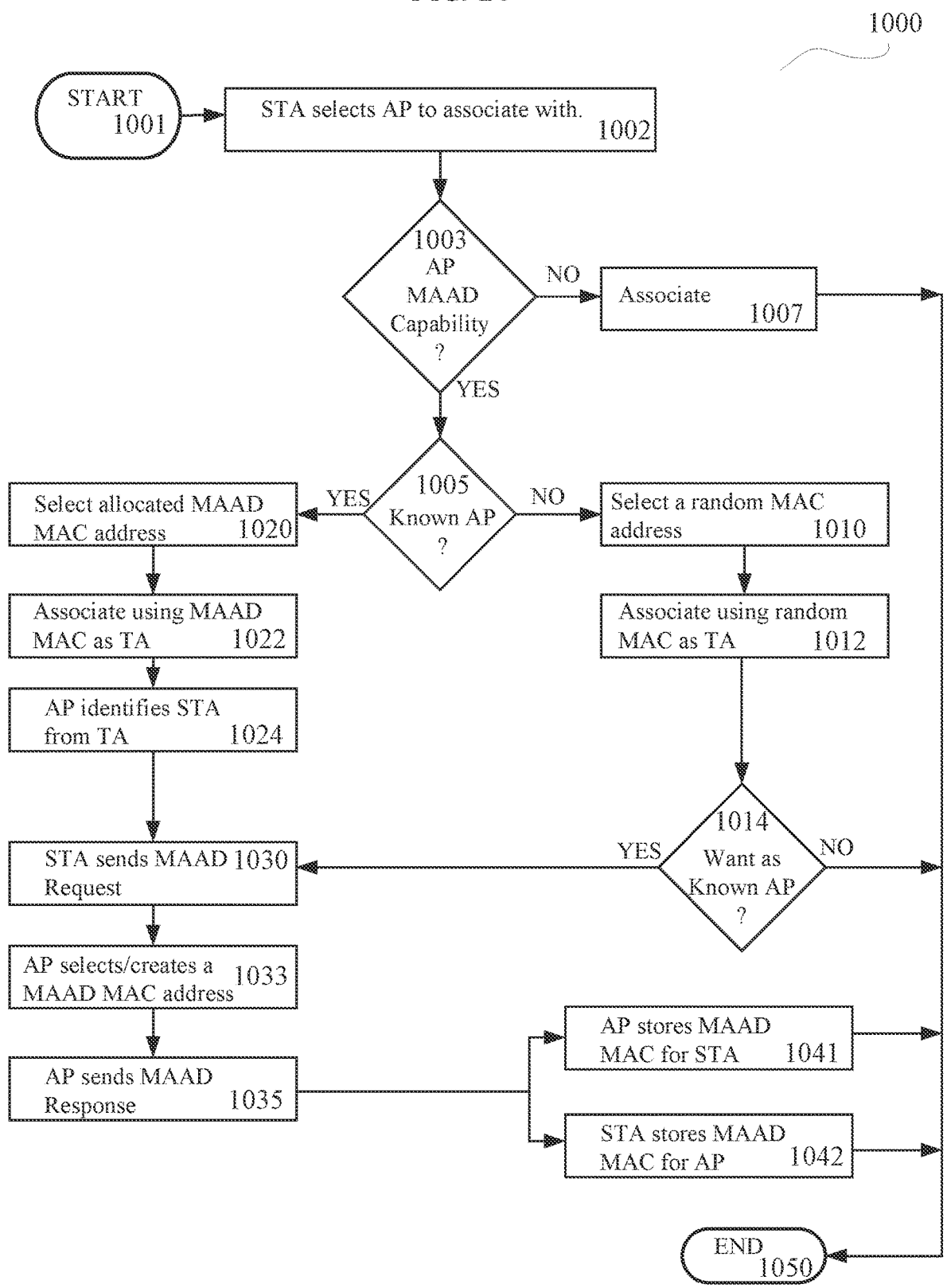
FIG. 10 is an example flow diagram illustrating an embodiment of the method of the present disclosure, when STA is preparing to associate to AP and robust action frames are used for the AP to allocate the MAAD MAC address to the STA.

FIG. 10 is an example flow diagram 1000 illustrating an embodiment of the method of the present disclosure, when STA 120 is preparing to associate to AP 110 and robust action frames are used for the AP 110 to allocate the MAAD MAC address to the STA 120. The method may start at step 1001. At step 1002, the STA 120 selects an AP 110 to associate with. At step 1003, STA 120 may check that the selected AP 110 is advertising that it supports MAAD. As discussed above with reference to FIG. 4, an AP 110 that supports the MAAD scheme may set the MAAD Capability bit to 1 in the Extended Capabilities field 400. This determination may be performed by the processing circuitry 820 analyzing packets received via the RF receiver 812. If, at step 1003, the AP 110 is advertising support for MAAD, then step 1003 may be followed by step 1005 where the STA 120 may check if AP 110 is a "known" AP, i.e., one that STA 120 has previously been associated with. If, at step 1003, the STA 120 determines that the AP 110 does not support MAAD, then at step 1007 STA 120 may associate with AP 110 and the method ends at step 1050. If, at step 1005, the STA 120 determines that AP 110 is known, i.e., one that STA 120 has previously been associated with, then, at step 1020, STA 120 may check through its list of stored MAAD MAC #1 580 addresses in order to find the MAC address that corresponds to that allocated by this AP 110 at the previous association of STA 120 with that AP 110. The list of MAAD MAC allocations and the respective APs may be stored in memory 822. The list may be checked by processing circuitry 820. Then at step 1022 STA 120 may set its TA to that allocated MAAD MAC #1 580 address and STA 120 may associate with AP 110. The setting of the TA and the process of association may take place using processing circuitry 820, RF transmitter 811 and RF receiver 812. Similarly, at AP 110, the association process may be carried out using processing circuitry 920, RF transmitter 911 and RF receiver 912. At step 1024 the AP 110 may identify STA 120 from the TA by checking the address against its stored MAAD MAC addresses. The list of MAAD MAC address allocations and the respective STAs may be stored in memory 922 and the list may be checked by processing circuitry 920.

If, at step 1005, STA 120 determines that AP 110 is not a known AP, i.e., one that STA 120 has not previously been associated with, then at step 1010 STA 120 may select a random (or fixed) MAC address and at step 1012 associate to the AP 110. At step 1014, STA 120 may determine if it wants to have AP 110 as a "known" AP, i.e., STA 120 would want to be identifiable to that AP 110. If not, then the method ends 1050. If STA 120 does want to be identifiable to that AP 110, then the method may advance to step 1030. The decision to identify AP 110 as one that STA 120 wants to be identifiable to may depend upon the characteristics of AP 110 and the network it is part of Applications running in the processor circuitry 820 may be tasked with the decision process.

Once STA 120 is associated with AP 110, STA 120 may, at step 1030, request MAAD MAC addresses (e.g., new MAAD MAC addresses) by sending, via RF transmitter 811, a MAAD Request Action frame 550, to the AP 110. Note that this request does not form part of the association. In some embodiments, the timing of the sending of the MAAD Request Action frame 550 is not critical and may take place at any time whilst STA 120 is associated with AP 110. At step 1033, AP 110, having received the MAAD Request Action frame 550, may select or create new MAAD MAC addresses for STA 120 and at step 1035 AP 110 sends, via RF transmitter 911, a MAAD Response Action frame 570 to STA 120 containing the new MAAD MAC addresses 580 and 590. The sending of MAAD Request Action frame 550 and subsequent sending of the MAAC Response Action frame 570 is referred to herein as "action frame 550 and 570 exchange." At step 1041, AP 110 may store, in module 922, that new MAAD MAC address for that STA 120, and similarly at step 1042, STA 120 may store, in memory 822, that new MAAD MAC address for that AP 110 and the method ends 1050.

As the action frame 550 and 570 exchange, providing the (new) MAAD MAC addresses takes place after association, the exchange is secure. Also, it may be noted that each time STA 120 associates to AP 110 it will use a different MAC address as its TA and therefore STA 120 cannot be tracked by a third party. The action frame exchange 550 and 570 does not form part of the association and hence may be carried out at any time whilst STA 120 is associated to AP 110. In other words, the action frame 550 and 570 exchange may take place any time prior to STA 120 leaving the network. It may also be noted that STA 120 may be identified by AP 110 before association. For example, STA 120 may send directed probe requests to AP 110 using either MAAD MAC #1 580 address or, preferably, MAAD MAC #2 590 address and AP 110 may identify STA 120 from the TA in the probe. In addition, AP 110 may identify STA 120 from the TA in the Association Request before the association starts or completes.

Figure 11:
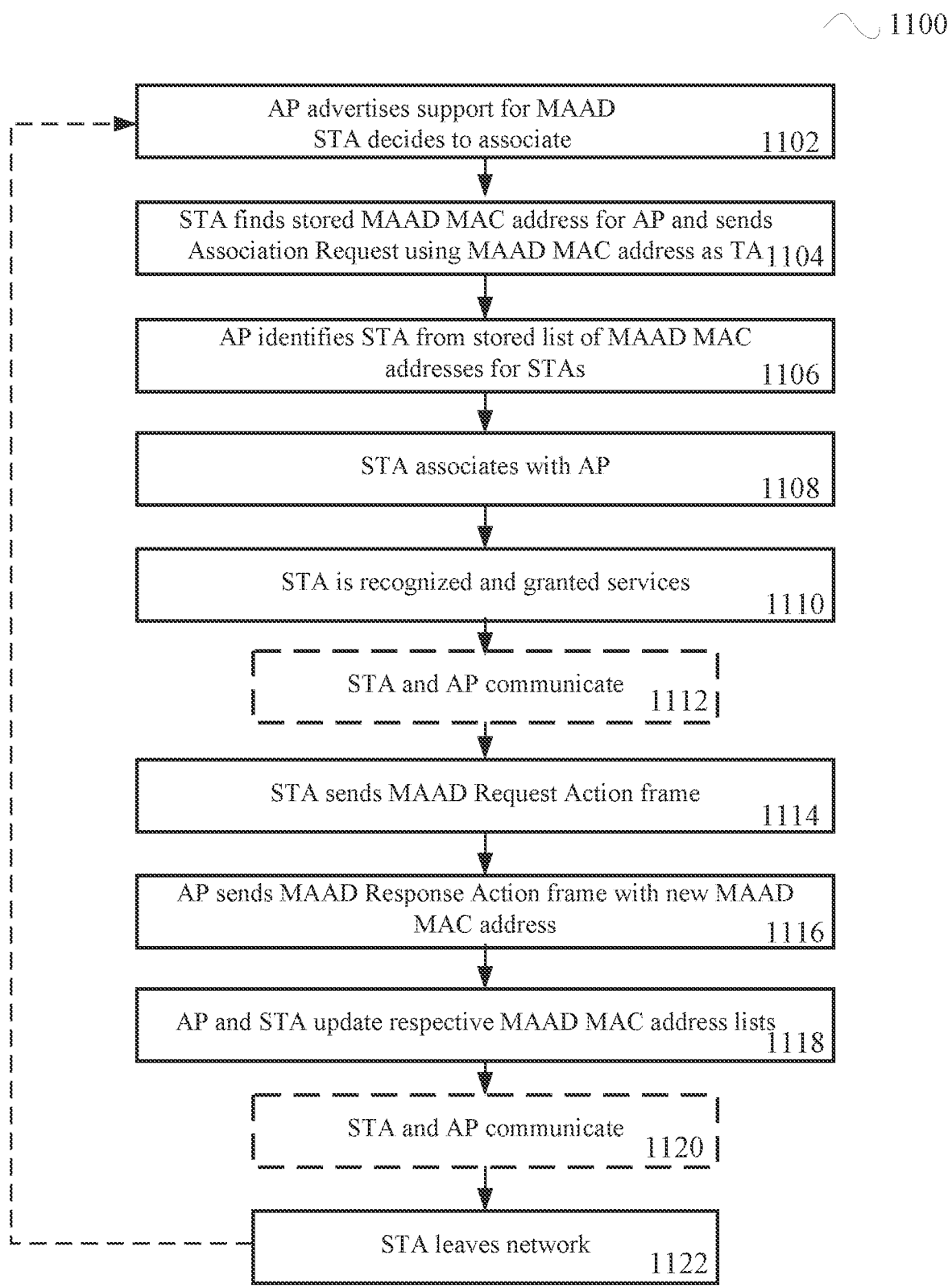
FIG. 11 is an example flow diagram of one implementation of the disclosure where a STA associates with an AP 110 where robust action frames are used for the AP to allocate the MAAD MAC address to the STA.

FIG. 11 is an example flow diagram 1100 of one implementation of the disclosure where a STA 120 associates with an AP 110 where robust action frames are used for the AP 110 to allocate the MAAD MAC addresses to the STA 120. At step 1102, STA 120 notes that AP 110 is advertising support for MAAD and STA 120 decides to associate to AP 110. To advertise MAAD support, AP 110 sets the MAAD Capability bit in the extended Capabilities field as discussed above with reference to FIG. 4. At step 1104, STA 120 searches through its stored list of MAAD MAC addresses, finds the address corresponding to AP 110, and sets the TA accordingly in the Association Request sent to AP 110. STA 120 may also perform the search for a MAAD MAC address related to AP 110 at step 1102 and, if STA 120 finds an address, that may be a positive factor as to the decision by STA 120 to associate to AP 110. At step 1106, AP 110 notes the TA in the Association Request from STA 120 and then searches through its stored list of allocated MAAD MAC addresses in order to identify STA 120. At step 1108, STA 120 completes association with AP 110. At step 1110, if AP 110 did not already identify STA 120 at step 1106, AP 110 will identify STA 120 by searching through its stored list of allocated MAAD MAC addresses, and hence can allocate resources or services that are related to that STA 120. At step 1112, STA 120 and AP 110 may communicate.

At any time, whilst associated, at step 1114, STA 120 sends a MAAD Request Action frame 550 to AP 110 and at step 1116, AP 110 responds with a MAAD Response Action frame 570 that contains new MAAD MAC address 701. At step 1118, AP 110 and STA 120 update their MAAD MAC address lists. For step 1120, STA 120 and AP 110 may continue to be in communication until step 1122 when STA 120 leaves the network and disassociates from AP 110. The next time STA 120 decides to associate with AP 110, at step 1104, STA 120 will select as TA the MAAD MAC address 580 allocated at step 1116 during the previous association.

As discussed above with reference to FIGS. 10 and 11, each time STA 120 associates to AP 110, STA 120 uses as its TA, the MAAD MAC #1 address 580 that AP 110 allocated to that STA 120 at the previous association. As this allocation is carried out using robust action frames, i.e., frames that are encrypted, and as each time STA 120 associates with a different TA, then the tracking of STA 120 by a third party is impossible. Furthermore, as STA 120 is using an identifiable address as its TA, many existing applications that use the MAC address of the associating station as the identifier can simply adapt to using this MAAD MAC method. The STA 120 may use an allocated MAC #2 address 590 in directed and broadcast probes, and hence AP 110 can identify STA 120 from the TA by comparing it to a list that the AP 110 stores. This stored list, again, is similar to the list maintained by many existing applications that identify the station by its TA. The difference is that the TA is now random and changing, maintaining the privacy of the STA 120.

In another implementation of the disclosure, the STA 120 may advertise support for MAAD by including the MAAD Capability element 400 in its Extended Capabilities field. In this case, AP 110 may then send an unsolicited MAAD Response Action field for STA 120 at any time whilst STA 120 is associated. Hence, in FIG. 10, step 1030 is omitted and in FIG. 11 step 1114 is omitted.

Figure 12:
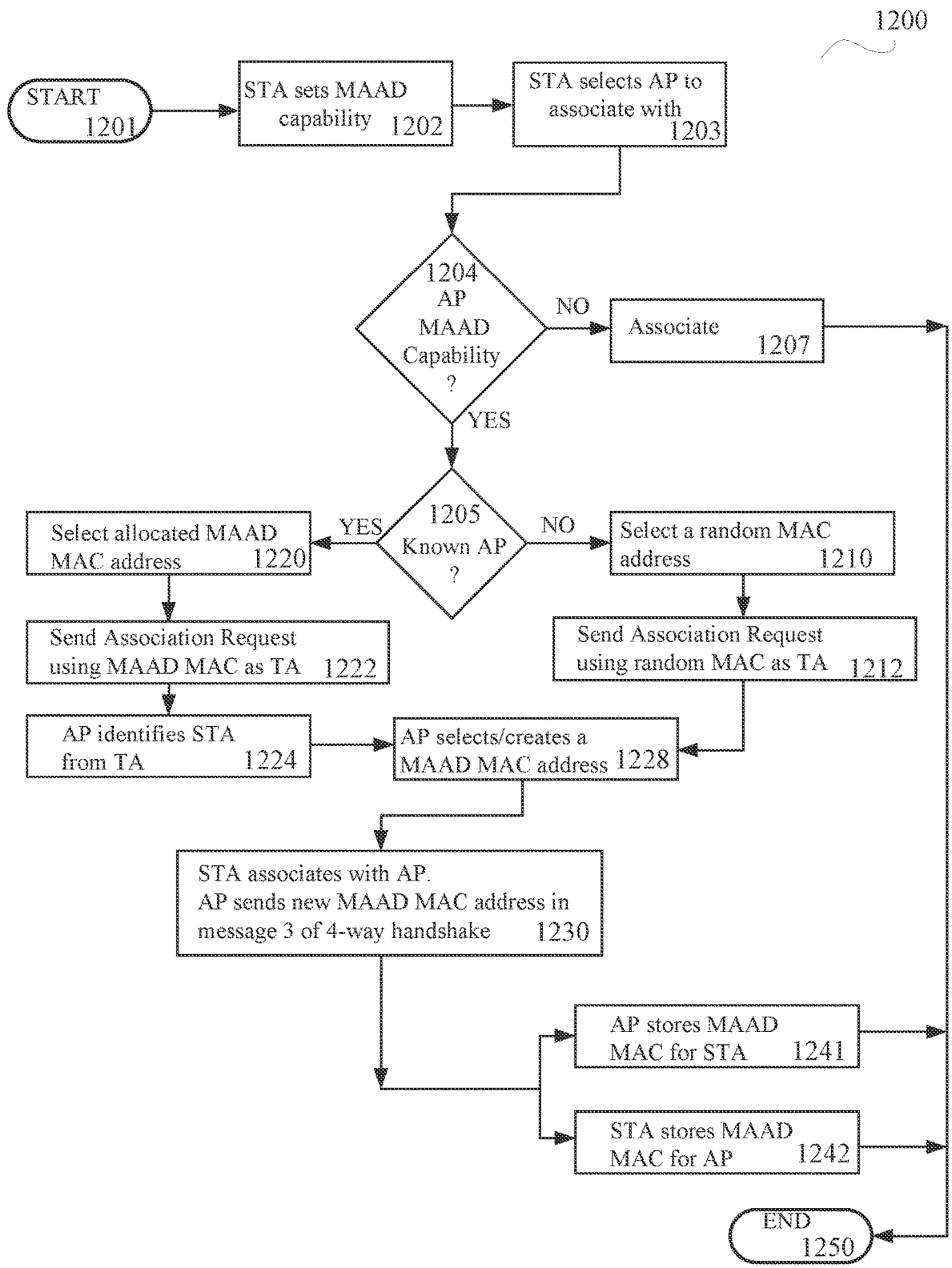
FIG. 12 is an example flow diagram illustrating an embodiment of the method of the present disclosure when STA is preparing to associate to AP and the MAAD MAC address is allocated using a MAAD KDE inserted into message 3 of the 4-way handshake.

FIG. 12 is an example flow diagram 1200 illustrating an embodiment of the method of the present disclosure when STA 120 is preparing to associate to AP 110 and the MAAD MAC address is allocated using a MAAD KDE 700 inserted into message 3 603 of the 4-way handshake. The method may start at step 1201. At step 1202, the STA 120 sets the MAAD Capability bit to 1 in the Extended Capabilities field 400 to indicate support for MAAD. At step 1203, the STA 120 selects an AP 110 to associate with, and at step 1204, STA 120 may check that the selected AP 110 is advertising that it supports MAAD. This determination may be performed by the processing circuitry 820 analyzing packets received via the RF receiver 812. As discussed above with reference to FIG. 4, an AP 110 or STA 120 that supports the MAAD scheme will set the MAAD Capability bit to 1 in the Extended Capabilities field 400. If, at step 1204, the STA 120 determines that the AP 110 does not support MAAD, then at step 1207 STA 120 may associate with AP 110 and the method ends 1050. If, at step 1203, the AP 110 is advertising support for MAAD, then step 1203 may be followed by step 1204 where the STA 120 may check if AP 110 is a "known' AP, i.e., one that STA 120 has previously been associated with. If, at step 1205, the STA 120 determines that AP 110 is known, i.e., one that STA 120 has previously been associated with, then, at step 1220, STA 120 may check through its list of stored MAAD MAC #1 705 addresses in order to find the MAC address that corresponds to that allocated by this AP 110 at the previous association of STA 120 with that AP 110. The list of MAAD MAC #1 and #2 allocations and the respective APs may be stored in memory 822 and the list may be checked by processing circuitry 820. Then at step 1222, STA 120 may set its TA to that allocated MAAD MAC #1 705 address and STA 120 may send an Associate Request to AP 110. The setting of the TA and the process of association may take place using processing circuitry 820, RF transmitter 811 and RF receiver 812. Similarly, at AP 110, the association process may be carried out using processing circuitry 920, RF transmitter 911 and RF receiver 912. At step 1224, the AP 110 may identify STA 120 from the TA by checking the address against its stored MAAD MAC #1 705 addresses. The list of MAAD MAC address allocations and the respective STAs may be stored in memory 922 and the list may be checked by processing circuitry 920. If, at step 1205, STA 120 determines that AP 110 is not a known AP, i.e., one that STA 120 has not previously been associated with, then at step 1210 STA 120 may select a random (or fixed) MAC address and, at step 1212, send an Association Request to the AP 110.

At step 1228, AP 110 having received an Association Request from STA 120 may select or create new MAAD MAC addresses for STA 120, and at step 1230, during the association process, AP 110 includes a MAAD KDE 700 in message 3 603 of the 4-way handshake as discussed above with reference to FIGS. 6 and 7. At step 1241, AP 110 may store, in module 922, that new MAAD MAC addresses 705 and 706 for that STA 120, and similarly at step 1242, STA 120 may store, in memory 822, the new MAAD MAC addresses for that AP 110 and the method ends 1250.

As the 4-way handshake, discussed above with reference to FIG. 6, provides the MAAD MAC addresses in the MAAD KDE 700, the exchange is secure. Also, it may be noted that each time STA 120 associates to AP 110 it will use a different MAC address as its TA and therefore STA 120 cannot be tracked by a third party. It may also be noted that STA 120 may be identified by AP 110 before association. For example, STA 120 may send directed or broadcast probe requests to AP 110 using either MAAD MAC #1 705 or address MAAD MAC #2 706 address as TA and AP 110 may identify STA 120 from the TA in the probe. In addition, AP 110 may identify STA 120 from the TA in the Association Request before the association starts. Using MAAD MAC #2 706 address as the TA in probes, when STA 120 is in the vicinity of AP 110, may further prevent a listener from determining, and subsequently copying the MAAD MAC address used to associate. Probes may be used for steering purposes within an extended service set, ESS, and when so used, it is important that the STA 120 is identified prior to association.

Figure 13:
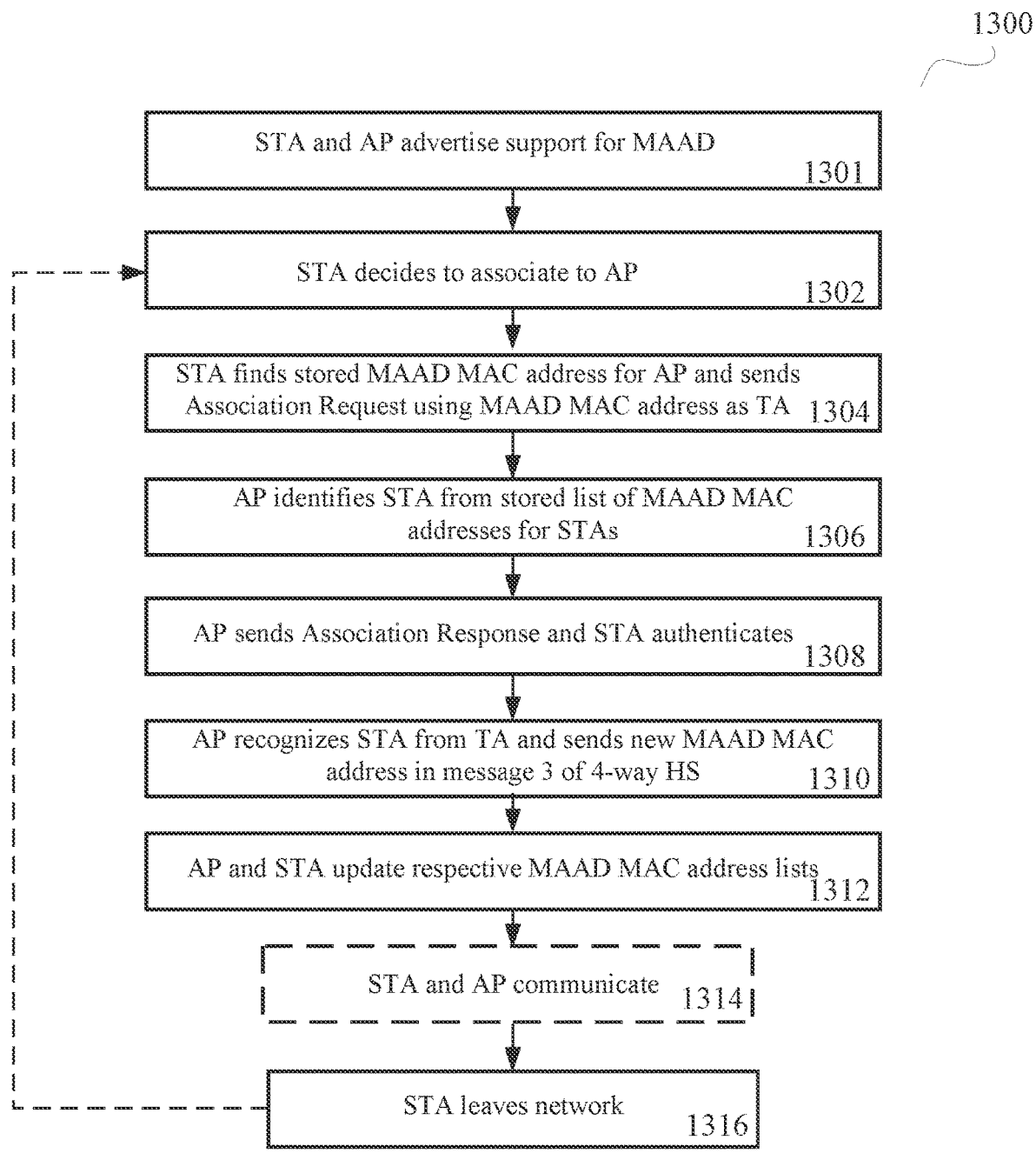
FIG. 13 is an example flow diagram of another implementation of the disclosure where a STA associates with an AP where the MAAD MAC address is allocated using a MAAD KDE inserted into message 3 of the 4-way handshake.

FIG. 13 is an example flow diagram 1300 of another implementation of the disclosure where a STA 120 associates with an AP 110 where the MAAD MAC addresses are allocated using a MAAD KDE 700 inserted into message 3 603 of the 4-way handshake. At step 1301, both STA 120 and AP 110 advertise support for MAAD by setting the MAAD Capability bit 400 in their Extended Capabilities fields. At step 1302, STA 120 decides to associate to AP 110. At step 1304, STA 120 searches through its stored list of MAAD MAC addresses, finds the address corresponding to AP 110, and sets the TA accordingly in the Association Request sent to AP 110. STA 120 may also perform the search for a MAAD MAC address related to AP 110 at step 1302 and, if STA 120 finds an address, that may be a positive factor as to the decision by STA 120 to associate to AP 110. At step 1306, AP 110 notes the TA in the Association Request from STA 120 and then searches through its stored list of allocated MAAD MAC addresses in order to identify STA 120. At step 1308, AP 110 sends an Association Response and STA 120 authenticates with AP 110. At step 1310, AP 110 and STA participate in the 4-way handshake and AP 110 includes new MAAD MAC addresses in the MAAD KDE 700 that it includes in message 3 603. At step 1312, AP 110 and STA 120 update their MAAD MAC address lists and at step 1314, STA 120 and AP 110 may continue to be in communication until step 1316 when STA 120 leaves the network and disassociates from AP 110.

It may be noted that if STA 120 reassociates to the same AP 110 or another AP in the same ESS, then it should use the same MAAD MAC address as its TA that it used for the association. In other words, the MAAD MAC address is not updated or changed when STA 120 reassociates, only when STA 120 associates. Prior to association, however, STA 120 may use MAAD MAC #2 (580 or 706) address in probes such that the STA 120 may be steered to the "best" AP in the ESS. The APs in the ESS will identify STA 120 from the MAAD MAC #2 address but the address for association, MAAD MAC #1, will not be disclosed.

As the MAAD MAC address is allocated by the AP 110, the AP 110 could insert a code into the addresses it provides to STAs, which may be used by the AP to quickly identify addresses that it has allocated. This code could take many forms from a simple pseudo OUI to a more complicated code contained within the pseudo random bits of the address.

Figure 14:
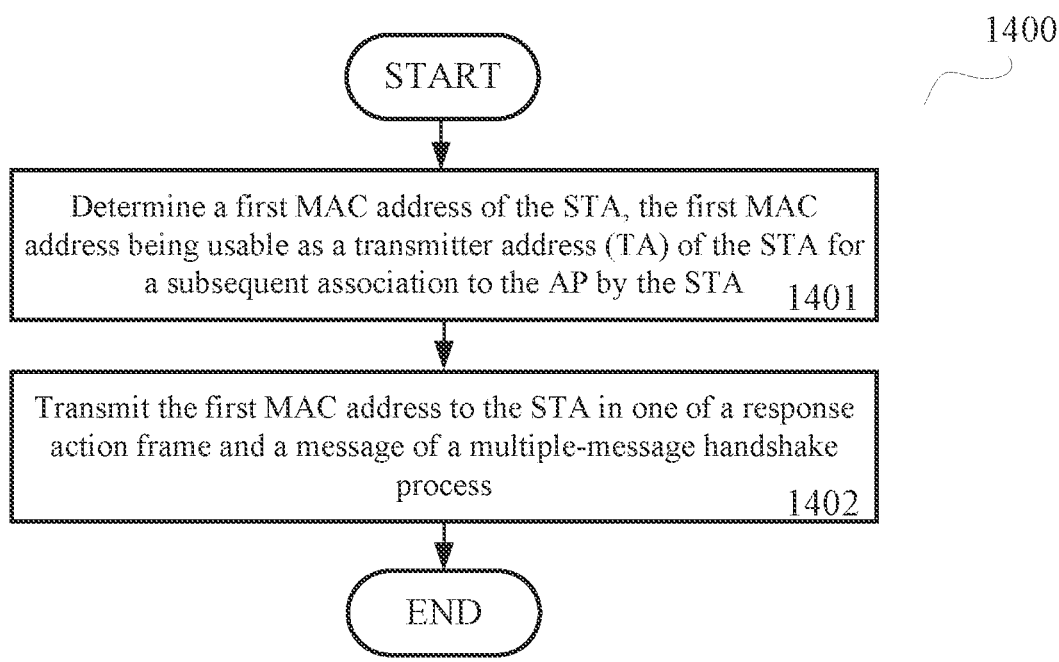
FIG. 14 is a flow diagram of an example process according to some embodiments of the present disclosure.

FIG. 14 is a flow diagram 1400 of an example process (i.e., method) according to some embodiments of the present disclosure. The method is implemented in an access point (AP) 110 configured for medium access control (MAC) address designation (MAAD). The AP 110 is configured to wirelessly communicate with a station (STA) 120. The method comprises determining (Block S1401) a first MAC address of the STA 120, where the first MAC address is usable as a transmitter address (TA) of the STA 120 for a subsequent association to the AP 110 by the STA 120, and transmitting (Block S1402) the first MAC address to the STA 120 in one of a response action frame and a message of a multiple-message handshake process.

In some embodiments, the method further includes determining a second MAC address of the STA 120, where the second MAC address is usable for probes.

In some other embodiments, the first MAC address is transmitted during a first association to the AP 110 by the STA 120, where the subsequent association occurs after the first association.

In some embodiments, the method further includes performing the subsequent association using the first MAC address.

In some other embodiments, the method further includes receiving a request action frame from the STA, where the received request action frame triggers one or both of the determination of the first MAC address and the transmission of the first MAC address in the response action frame.

In some embodiments, the method further includes receiving a random MAC as the TA, where the received random MAC triggers one or both of the determination of the first MAC address and the transmission of the first MAC address.

In some other embodiments, the method includes receiving an association request from the STA 120, where the association request comprises one MAC address selected by the STA 120 as the TA from a first list of MAC addresses stored at the STA 120, and identifying the STA 120 from a second list of MAC addresses stored at the AP 110 based on received association request.

In some embodiments, the identification of the STA 120 triggers one or both of the determination of the first MAC address and the transmission of the first MAC address.

In some other embodiments, the first MAC address is transmitted to the STA 120 in the message of the multiple-message handshake process using a key encapsulation (KDE) format.

In some embodiments, the method further includes inserting a code into the first MAC address, where the code is usable for identification of the STA 120.

In some other embodiments, one or more of the method further includes receiving a first capability message from the STA 120 indicating the STA 120 supports MAAD; the transmission of the first MAC address is one or both of unsolicited by the STA 120 and in response to the first capability message; the method further includes transmitting a second capability message to the STA 120 indicating the AP 110 supports MAAD; and the first MAC address is a MAAD MAC address.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: alternative acronyms for MAAD, details of the MAAD action field, details of the allocated MAC address, details of the MADD Request, times when MAAD Request is sent, use of unsolicited MAAD Response, details of the MADD KDE, storing of the MAAD MAC addresses, use of one or more MAAD MAC addresses.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and following claims.

What is claimed is:

1. A method in an access point (AP) configured for medium access control (MAC) address designation (MAAD), the AP being configured to wirelessly communicate with a station (STA), the STA being configured to perform a plurality of associations with the AP, the AP being configured to provide a MAC address to the STA for each association of the plurality of associations with the AP such that the STA is identifiable by the AP without being trackable by a device other than the STA and the AP, the method comprising:
   for a first association of the plurality of associations with the AP:
      exchanging an association request and an association response with the STA, using a first MAC address as an STA transmitter address (TA) to initiate another association of the STA with the AP, the first MAC address being selected by the STA;
      determining a second MAC address of the STA, the second MAC address being usable as the TA of the STA for a next association with the AP by the STA;
      transmitting the second MAC address to the STA in one of a response action frame and one message of a multiple-message handshake process;
   for subsequent associations of the plurality of associations of the STA with the AP:
      determining a new MAAD MAC address for the STA, the new MAAD MAC address being usable as the TA of the STA for the next association with the AP by the STA, the new MAAD MAC address being different from a previous MAAD MAC address transmitted by the AP to the STA at a previous association; and
      transmitting the new MAAD MAC address to the STA in one of another response action frame and another message of the multiple-message handshake process.

2. The method of claim 1, wherein the method further includes:
   determining a third MAC address of the STA, the third MAC address being usable for probes.

3. The method of claim 1, wherein the method further includes:
   inserting key data including the new MAAD MAC address into a third message of the multiple-message handshake process that takes place when the STA associates with the AP, and the multiple-message handshake process is a 4-way message handshake process.

4. The method of claim 1, wherein the method further includes:
   advertising support for MAAD in one or more of beacons, probe responses, and association responses.

5. The method of claim 1, wherein the method further includes:
   advertising support for MAAD in one or more of probe requests and association requests.

6. The method of claim 1, wherein the method further includes:
   maintaining at the AP a list of latest allocated MAAD MAC addresses and STAs.

7. The method of claim 1, wherein the method includes:
   receiving another association request from the STA, the other association request comprising one MAC address selected by the STA as the TA from a first list of MAC addresses provided by APs at previous associations stored at the STA; and
   identifying the STA from a second list of MAC addresses stored at the AP based on received association request.

8. The method of claim 7, wherein the identification of the STA triggers one or both of the determination of the new MAAD MAC address and the transmission of the new MAAD MAC address.

9. The method of claim 1, wherein the new MAAD MAC address is transmitted to the STA in the one message of the multiple-message handshake process using a key encapsulation (KDE) format.

10. The method of claim 1, wherein the method further includes:
   inserting a code into the new MAAD MAC address, the code being usable for identification of the STA.

11. The method of claim 1, wherein one or more of:
   the method further includes receiving a first capability message from the STA indicating the STA supports MAAD;
   the transmission of the first MAC address is one or both of unsolicited by the STA and in response to the first capability message;
   the method further includes transmitting a second capability message to the STA indicating the AP supports MAAD; and
   the first MAC address is a MAAD MAC address.

12. An access point (AP) configured for medium access control (MAC) address designation (MAAD), the AP being configured to wirelessly communicate with a station (STA), the STA being configured to perform a plurality of associations with the AP, the AP being configured to provide a MAC address to the STA for each association of the plurality of associations with the AP such that the STA is identifiable by the AP without being trackable by a device other than the STA and the AP, the AP comprising processing circuitry configured to:
for a first association of the plurality of associations with the AP:
exchange an association request and an association response with the STA, using a first MAC address as an STA transmitter address (TA) to initiate another association of the STA with the AP, the first MAC address being selected by the STA;
determine a second MAC address of the STA, the second MAC address being usable as the TA of the STA for a next association with the AP by the STA;
cause transmission of the second MAC address to the STA in one of a response action frame and one message of a multiple-message handshake process;
for subsequent associations of the plurality of associations of the STA with the AP:
determine a new MAAD MAC address for the STA, the new MAAD MAC address being usable as the TA of the STA for the next association with the AP by the STA, the new MAAD MAC address being different from a previous MAAD MAC address transmitted by the AP to the STA at the previous association; and
cause transmission of the new MAAD MAC address to the STA in one of another response action frame and another message of the multiple-message handshake process.

13. The AP of claim 12, wherein the processing circuitry is further configured to:
determine a third MAC address of the STA, the third MAC address being usable for probes.

14. The AP of claim 12, wherein the processing circuitry is further configured to:
insert key data including the new MAAD MAC address into a third message of the multiple-message handshake process that takes place when the STA associates with the AP, and the multiple-message handshake process is a 4-way message handshake process.

15. The AP of claim 12, wherein the processing circuitry is further configured to:
advertise support for MAAD in one or more of beacons, probe responses, and association responses.

16. The AP of claim 12, wherein the processing circuitry is further configured to:
advertise support for MAAD in one or more of probe requests and association requests.

17. The AP of claim 12, wherein the processing circuitry is further configured to:
maintain a list of latest allocated MAAD MAC addresses and STAs.

18. The AP of claim 12, wherein the processing circuitry is further configured to:
receive another association request from the STA, the other association request comprising one MAC address selected by the STA as the TA from a first list of MAC addresses provided by APs at previous associations stored at the STA; and
identify the STA from a second list of MAC addresses stored at the AP based on received association request.

19. A system configured for medium access control (MAC) address designation (MAAD), the system comprising an access point (AP) and a station (STA), the AP being configured to wirelessly communicate with the STA, the STA being configured to perform a plurality of associations with the AP, the AP being configured to provide a MAC address to the STA for each association of the plurality of associations with the AP such that the STA is identifiable by the AP without being trackable by a device other than the STA and the AP:
the STA comprising first processing circuitry configured to:
for a first association of the plurality of associations with the AP:
select a first MAC address;
exchange an association request and an association response with the AP, using the first MAC address as an STA transmitter address (TA) to initiate another association of the STA with the AP;
the AP comprising second processing circuitry configured to:
determine a second MAC address for the STA, the second MAC address being usable as the TA of the STA for a next association with the AP by the STA;
cause transmission of the second MAC address to the STA in one of a response action frame and one message of a multiple-message handshake process;
for subsequent associations of the plurality of associations of the STA with the AP:
determine a new MAAD MAC address for the STA, the new MAAD MAC address being usable as the TA of the STA for the next association with the AP by the STA, the new MAAD MAC address being different from a previous MAAD MAC address transmitted by the AP to the STA at a previous association; and
cause transmission of the new MAAD MAC address to the STA in one of another response action frame and another message of the multiple-message handshake process.

20. The system of claim 19, wherein one or both of:
the first processing circuitry of the STA is further configured to:
maintain at the STA a list of latest allocated MAAD MAC addresses and the AP; and
the second processing circuitry of the AP is further configured to:
insert key data including the new MAAD MAC address into a third message of the multiple-message handshake process that takes place when the STA associates with the AP.

* * * * *